Jan. 25, 1966     H. P. JOHNSON     3,230,768
FLOW METER
Filed Nov. 16, 1962     3 Sheets-Sheet 1
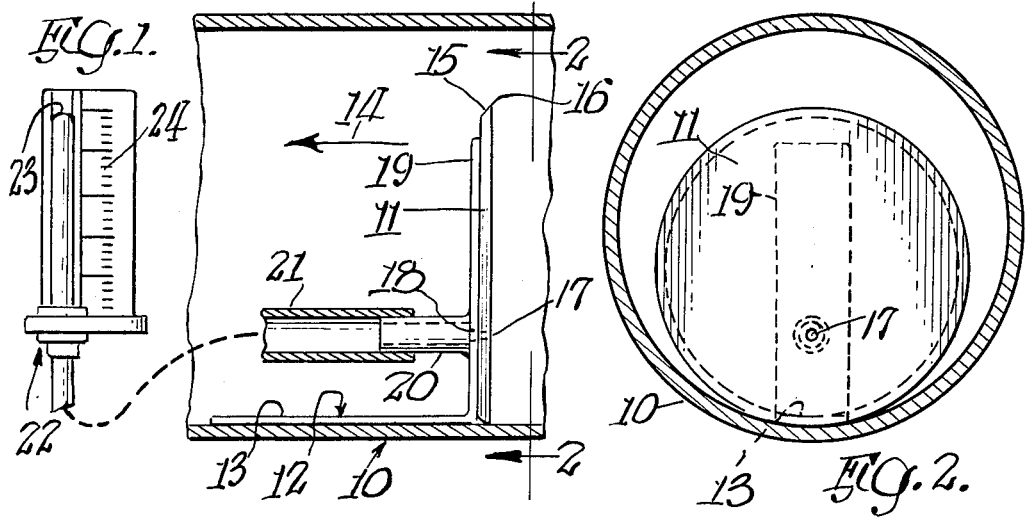
Inventor
Howard P. Johnson
by Dawson, Tilton, Fallon
Lungmus & Alexander Attys Jan. 25, 1966  H. P. JOHNSON  3,230,768
FLOW METER
Filed Nov. 16, 1962  3 Sheets-Sheet 2

Inventor
Howard P. Johnson
by Dawson, Tilton, Fallon
Lungmus & Alexander, Attys

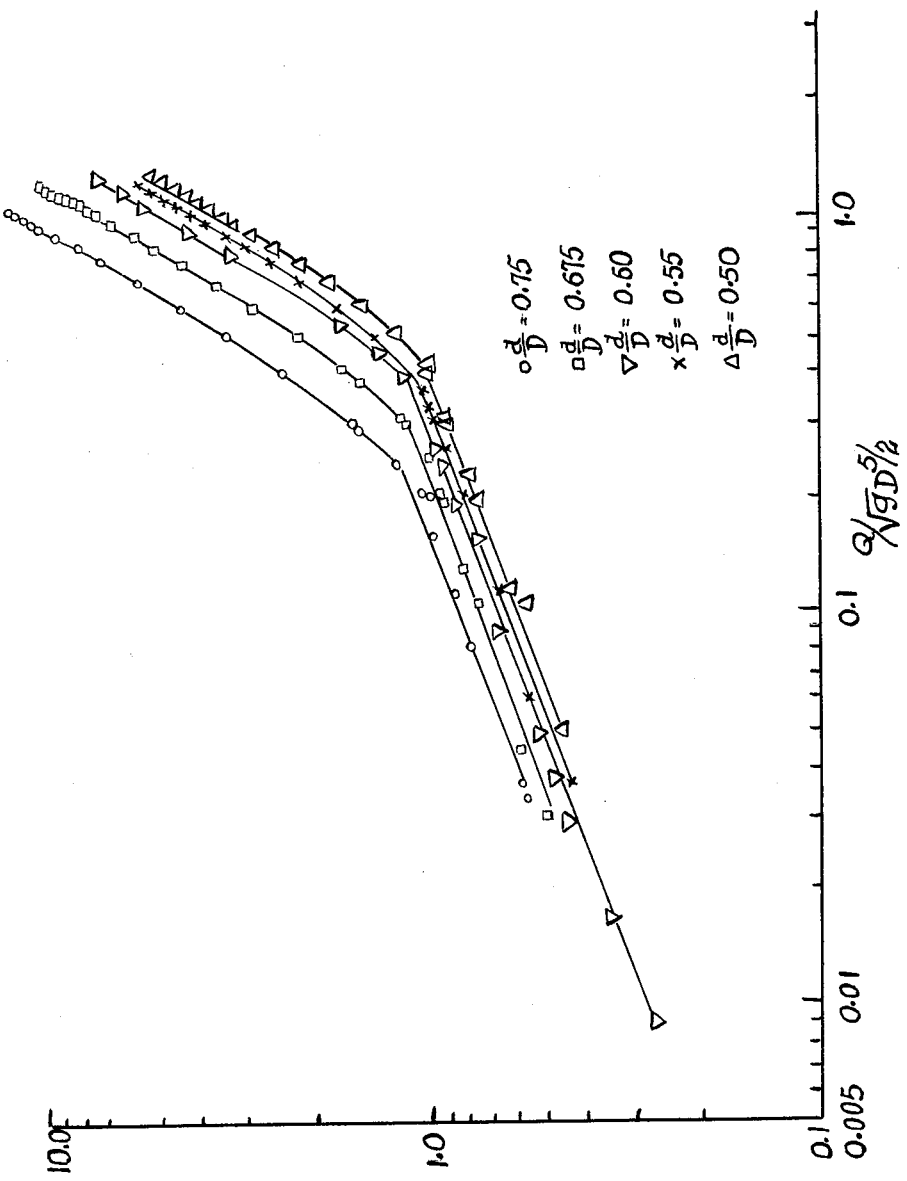

United States Patent Office 3,230,768
Patented Jan. 25, 1966

3,230,768
FLOW METER
Howard P. Johnson, Ames, Iowa, assignor to Iowa State University Research Foundation, Inc., Ames, Iowa
Filed Nov. 16, 1962, Ser. No. 238,150
1 Claim. (Cl. 73—205)

This invention relates to a flow meter, and, more particularly, to a meter for measuring liquid flow rates adjacent a pipe outlet.

The invention finds particular utility in connection with water resource work wherein there is a definite need for inexpensive measurement of water flows by farmers, county agents, and action program groups such as the Soil Conservation Service. Although meters for this type of use have been available, they have been relatively expensive and, equally or more importantly, have been inconvenient to transport and install, so that water delivery programs have been handicapped by imperfect control.

It is, therefore, a principal object of this invention to provide a novel flow meter which meets and solves the foregoing difficulties.

Another object of the invention is to provide a novel flow meter adapted for installation adjacent a pipe discharge outlet which includes an apertured plate uniquely constructed and positioned within the pipe and coupled to a piezometer for ready and easy determination of liquid flow rates.

Still another object of the invention is to provide a flow meter of the character described in the object immediately preceding which is further characterized by being adapted to report flow rates in both the open channel and full pipe ranges.

Other objects and advantages of the invention may be seen in the details of construction and operation set down in this specification.

The invention will be described in conjunction with an illustrative embodiment in the accompanying drawing, in which—

FIG. 1 is a fragmentary elevational view, partially in section, of a flow meter embodying the inventive teachings;

FIG. 2 is a sectional view, taken along the sight line 2—2 as applied to FIG. 1;

FIGS. 4 and 5 are plots similar to FIG. 3 but on logarithmic scale for different pipe installations.

Figure 3:
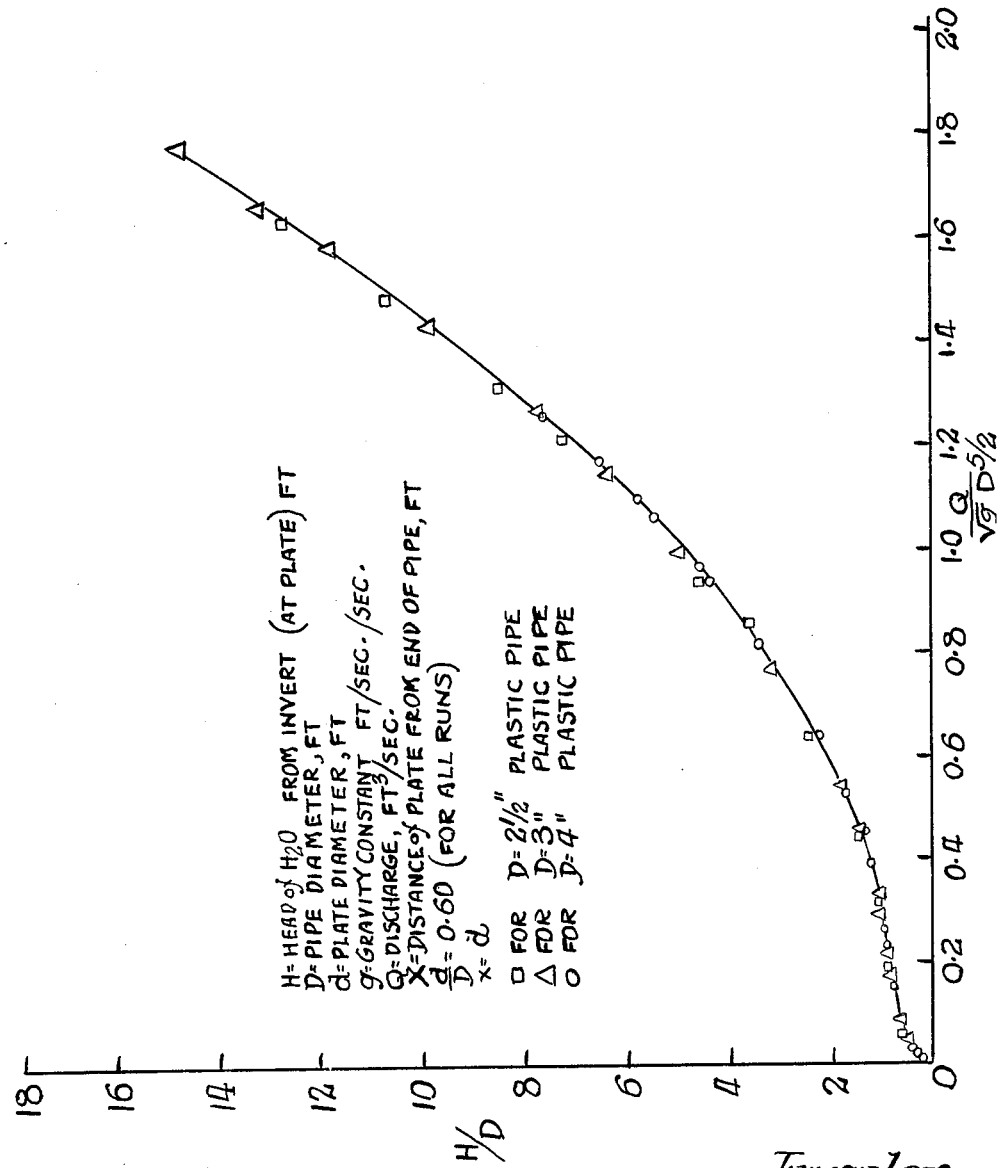
FIG. 3 is a plot of the operation of the device of FIGS. 1 and 2 wherein head is related to discharge.

In general, the inventive is characterized by the use of a circular plate installed within a pipe carrying liquid to be discharged and adjacent the discharge end of the pipe. As such, the inventive meter makes use of the pressure change resulting from acceleration of flow in a constriction, the circular plate being equipped with an aperture providing the pressure connection.

The construction can be readily appreciated from the accompanying drawing, particularly FIG. 1, wherein the numeral 10 designates generally a pipe carrying liquid for discharge, for example, an irrigation pipe of 10" or 12" diameter carrying water. Mounted within the pipe transversely to the pipe axis, is a circular plate 11 (see especially FIG. 2) which is supported in the pipe 10 by means of a steel angle strap generally designated 12. The strap 12 is seen to have a horizontal leg 13 which extends downstream from the plate 11, as can be determined from the direction of the arrow 14 applied to FIG. 1. The leg 13 of the angle strap 12 can be secured to the pipe 10 in a variety of ways, welding, bolting, etc. Alternatively, the plate 11 may be clamped or otherwise secured in place.

The plate or disc member 11 is equipped with a 45° bevel as at 15 to provide a sharpened edge facing the flow of liquid as at 16. An aperture 17 is provided in the disc member 11 and, in the illustrative embodiment, an aligned aperture 18 is provided in the upstanding leg 19 of the angle strap 12. Secured to the angle strap 12 is a pressure tap or coupling 20 which may be welded or brazed to the upper leg 19. Coupled to the coupling or tap 20 is a flexible hose or conduit 21 which is seen to lead to a piezometer generally designated 22. The piezometer 22 is read by referring the meniscus 23 to a calibration 24 which is set down to exponentially relate discharge rates and heads, as can be appreciated from the logarithmic graphs seen in FIGS. 4 and 5.

It is believed that specific examples of the invention will aid in the understanding thereof, and for that purpose, the following is set down.

EXAMPLE I

A series of tests were run on relatively small diameter plastic pipes, namely, 4" and 2½" pipe. The circular disc 11 was constructed with a diameter of 2.4" for the 4" pipe, and in the 3" and 2½" runs, the diameter was correspondingly reduced so as to provide a ratio of disc to pipe diameters of 0.6. Hereinafter the disc diameter is represented by $d$, while the pipe diameter is represented by D, hence the ratio $d/D=0.6$. In all of the tests performed with the inventive construction, the aperture size was $\frac{1}{16}''$ in diameter.

In each case, the location of the pressure tap 20 was $d/4$ (for the 2.4" diameter disc, this being 0.6") from the bottom of the plate 11. Further, the upstream face of the plate was a distance $d$ (for the 4" pipe, 2.4") from the end of the pipe.

In this specific example, the circular plates 11 were constructed of plastic and mounted on steel angle strap 12 employing an epoxy resin bonding agent sold commercially as "Resiweld." The manufacturer of plastics employed to fabricate the small plates and taps was the Cadillac Plastics & Chemical Company, of St. Louis, Missouri. A variety of plastics and adhesives may be used in the construction of the meter, the preferred materials having sufficient strength and bonding qualities. In meters larger than 4" in diameter, brass or stainless steel is preferred. Also, the tap 20 was secured to the strap 12 by means of the same resin adhesive.

The desired range of discharges was obtained by the use of a constant speed pump with a valve on the discharge side to throttle the flow. All flows were weighed in a tank and timed to enable calculation of the rate of flow.

The data from the series of tests were plotted as dimensionless quantities ($Y$ equals $H/D$), $$(X \text{ equals } Q/\sqrt{g}D^{5/2})$$

Here, H is the distance from the inside bottom of the pipe at the plate to the meniscus level in the attached piezometer 22, Q is the discharge, and $g$ is the gravitational constant.

The results shown in FIG. 3 represent the data collected from all three sizes of pipe employed. The meter was further investigated to check the effect of placement with respect to the end of the discharging pipe. There was no significant variation in results in the tests made with the 4" diameter pipe where the meter was placed at 0.70", 2.40", and 3.70" from the end of the pipe.

A further series of tests investigating the two flow conditions (weir and pipe flow) were made. In order to ascertain that the data did not deviate for pipe of larger sizes, tests were made on 5" and 8" pipes, with the results shown in FIG. 5, which plots the same dimensionless variables but on logarithmic scales.

EXAMPLE II

For the tests on 5" and 8" pipes, the flow meter was placed in the same relative position in the steel pipe as in previous tests, i.e., one plate diameter upstream from the end of the pipe. The ratio of the plate diameter to the pipe diameter for the brass plate meter was again held at 0.6.

EXAMPLE III

In order to further investigate the flow meter, four additional plastic discs 11 were constructed to provide a range of $d/D$ of 0.5 to 0.75. Discs for ratios of $d/D$ of 0.5, 0.55, 0.675, and 0.75 were constructed. Tests on these meter were run in 4" diameter plastic pipe, and the results of these tests are shown in FIG. 4. The results plotted on logarithmic paper appear as two straight lines connected by a curved line in the region where the flow is shifting from weir flow to pipe flow. It is seen that the lines are straight and parallel in the region of pipe flow, the region of most interest.

From this, it will be noted that the device may also be used as a weir. Under these conditions, the discharge pipe into which the flow meter is placed should be made almost horizontal when open channel measurements are to be made. In essence, the flow must be in a subcritical range as it approaches the flow meter.

A comparison of FIGS. 3–5 shows that the data taken in five sizes of pipe varying from 2½" in diameter in plastic to 8" in diameter in steel defines the same line for a $d/D$ ratio of 0.6.

The circular plate flow meter of the invention is simple, convenient to use, and inexpensive to manufacture. It is also more simple to attach to a discharge pipe than an orifice meter and lighter, more convenient to transport and use. From tests made so far, it appears that the flow meter should be accurate within 5%. If more precision is desired, it can be provided by better control of the orifice plate construction, the installation of the flow meter, and the selection of the pipe in which the meter is to be placed.

The ratio of disc to pipe diameter is largely governed by the quantity of discharge coming from the given pipe. The range of the ratio of disc to pipe diameter of 0.5–0.75 is essentially the practical range. If the disc diameter is less than one-half the pipe diameter, there may not be sufficient restriction to create a reasonable head in the monometer. If the restriction is much over 0.75, the restriction is so severe that losses in the meter are large and the monometer reading would also be large unless the quantity of flow being discharged was very small.

The location of the disc 11 relative to the end of the pipe has been found not critical, as least up to the diameter of the pipe itself. A further excursion into the pipe yields increasing error in measurement. The precise point of objectionable inaccuracy is thus seen to be somewhat subjective, but for all practical matters, especially from the point of view of ease of use and accuracy, the meter, or, more precisely, the plate 11, is placed close to the end of the pipe. Relative to the size of the aperture, a small diameter, say in the range of 0.02–0.10", is a practical working range. If the aperture is kept small, it is easier to read the monometer, since the meniscus will remain more nearly in the same position, i.e., the meniscus will not be affected as much by turbulence in the flow. Further, the location of the aperture in the weir plate, i.e., the disc 11, is also not particularly critical. However, if the aperture location is changed, the meter will have to be recalibrated, that is, the head reading on the monometer is a function of the location of the aperture in the plate for a given discharge, the plate diameter, and the pipe diameter.

While, in the foregoing specification, a detailed description of an embodiment of the invention has been set down for the sake of explanation thereof, many variations in the details herein given may be made by those skilled in the art without departing from the spirit and scope of the invention.

I claim:

A flow meter, comprising:
 a pipe adapted to have liquid flow therein toward a discharge end,
 a disc mounted in said pipe transversely to the liquid flow therein within less than about one pipe diameter of said discharge end and adjacent the bottom of the pipe, said disc having a diameter in the range of 0.5–0.75 of the pipe diameter, said disc having a beveled periphery presenting a sharp outer edge positioned on the upstream side of said disc,
 said disc having an aperture extending therethrough of the order of 0.2–0.10" in diameter and positioned adjacent to but spaced from the lower edge of the disc, and
 a piezometer connected to said aperture on the downstream side of said disc, conduit means coupling said piezometer to said aperture and extending out of the discharge end of said pipe thereby avoiding the need for pipe seals, said piezometer including calibration means exponentially relating the liquid head developed therein to discharge rate.

References Cited by the Examiner

UNITED STATES PATENTS 1,662,248  4/1928  Jacob _____ 73—216

FOREIGN PATENTS 885,112  5/1943  France.
355,828  7/1922  Germany.
816,165  8/1951  Germany.
891,458  9/1953  Germany.

RICHARD C. QUEISSER, *Primary Examiner.*